US009225808B1

(12) United States Patent
Dropps

(10) Patent No.: US 9,225,808 B1
(45) Date of Patent: Dec. 29, 2015

(54) SYSTEMS AND METHODS FOR PROCESSING INFORMATION BY A NETWORK DEVICE

(71) Applicant: QLOGIC, Corporation, Aliso Viejo, CA (US)

(72) Inventor: Frank R. Dropps, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 564 days.

(21) Appl. No.: 13/678,121

(22) Filed: Nov. 15, 2012

(51) Int. Cl.
*H04L 29/06* (2006.01)

(52) U.S. Cl.
CPC ...................................... *H04L 69/28* (2013.01)

(58) Field of Classification Search
CPC ......... H04L 49/00; H04L 49/30; H04L 49/35; H04L 49/351; H04L 49/357; H04L 49/60; H04L 69/28; H04L 2212/0025
See application file for complete search history.

(56) References Cited

U.S. PATENT DOCUMENTS

| | | | |
|---|---|---|---|
| 7,295,572 B1* | 11/2007 | Haapala ........................ 370/466 |
| 2001/0050921 A1* | 12/2001 | Barker et al. ................. 370/465 |
| 2002/0024964 A1* | 2/2002 | Baum et al. ................... 370/419 |
| 2002/0048270 A1* | 4/2002 | Allen et al. ................... 370/392 |
| 2003/0156580 A1* | 8/2003 | Abraham et al. ............. 370/389 |
| 2004/0019714 A1* | 1/2004 | Kelley .................. G06F 13/385 710/52 |
| 2004/0085974 A1* | 5/2004 | Mies ....................... H04L 12/42 370/406 |
| 2004/0160892 A1* | 8/2004 | Agrawalla et al. ............ 370/203 |
| 2012/0307878 A1* | 12/2012 | Vijayaraghavan et al. ... 375/225 |
| 2013/0201989 A1* | 8/2013 | Hu et al. ........................ 370/392 |
| 2013/0286845 A1* | 10/2013 | Smith et al. ................ 370/235.1 |

\* cited by examiner

*Primary Examiner* — Brian J Gillis
*Assistant Examiner* — Gil H. Lee
(74) *Attorney, Agent, or Firm* — Klein, O'Neill & Singh, LLP

(57) ABSTRACT

Systems and methods for a network device are provided. The network device includes a receive segment for receiving frames for a plurality of sub-ports complying with the plurality of protocols. A frame complying with a first protocol is received at a first clock rate for a first sub-port and a frame complying with a second protocol is received at a second clock rate for a second sub-port. To process frames regardless of protocol type, the receive segment adds an internal header for the frame complying with the first protocol and for the frame complying with the second protocol. The internal header indicates a frame protocol type and identifies the first sub-port and the second sub-port such that the same logic can be used to process the frame complying with the first protocol and the frame complying with the second protocol.

13 Claims, 10 Drawing Sheets

| Ethernet Header 302 | FCOE Header 304 | SOF 306 | FC Header 308 | Pay Load 310 | FC CRC 312 | EOF 314 | Ethernet FCS 316 |

300

| FC Header 308 | | | |
|---|---|---|---|
| 31       24 | 23       16 | 15       08 | 07 |
| R_CTL | | D_ID | 308A |
| CS_CTL/Priority | | S_ID | 308B |
| Type | | F_CTL | |
| SEQ_ID | DF_CTL | SEQ_CNT | |
| OX_ID | | RX_ID | |
| Parameter | | | |

SYSTEMS AND METHODS FOR PROCESSING INFORMATION BY A NETWORK DEVICE

BACKGROUND

1. Technical Field

The embodiments disclosed herein are related to networks and network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description." one will understand how the features of the present embodiments provide the advantages described herein.

In one embodiment, a network device is provided. The network device includes a plurality of base-ports, each base-port coupled to a plurality of network links and each base-port including a plurality of sub-ports configured to operate as independent ports for sending and receiving information using one of the plurality of network links at a plurality of rates complying with a plurality of protocols. The network device includes a receive segment for receiving frames for the plurality of sub-ports complying with the plurality of protocols.

A frame complying with a first protocol is received at a first clock rate for a first sub-port and a frame complying with a second protocol is received at a second clock rate for a second sub-port. After pre-processing both the frames are processed by the same logic of the receive segment at a system clock rate. To process frames regardless of protocol type, the receive segment adds an internal header for the frame complying with the first protocol and for the frame complying with the second protocol, the internal header indicating a frame protocol type and identifying the first sub-port and the second sub-port such that the same logic can be used to process the frame complying with the first protocol and the frame complying with the second protocol.

In another embodiment, a network device having a plurality of base-ports, each base-port coupled to a plurality of network links and each base-port includes a plurality of sub-ports configured to operate as independent ports for sending and receiving information using one of the plurality of network links at a plurality of rates complying with a plurality of protocols is provided. The device includes a receive segment for receiving frames for the plurality of sub-ports complying with the plurality of protocols.

A frame complying with a first protocol is received at a physical coding layer (PCS) a first clock rate for a first sub-port and a frame complying with a second protocol is received by the PCS at a second clock rate for a second sub-port. After pre-processing both the frames are read by a media access control layer (MAC) for processing at a system clock rate. To process frames regardless of protocol type, the MAC adds an internal header for the frame complying with the first protocol and the frame complying with the second protocol, the internal header indicating a frame protocol type and identifying the first sub-port and the second sub-port such that the same logic can be used to process the frame complying with the first protocol and the frame complying with the second protocol.

In yet another embodiment, a machine implemented method is provided. The method includes receiving a frame complying with a first protocol at a first clock rate for a first sub-port and a frame complying with a second protocol at a second clock rate for a second sub-port at a base port from among a plurality of base-ports of a network device, where the base-port is coupled to a plurality of network links and includes a plurality of sub-ports configured to operate as independent ports for sending and receiving information using one of the plurality of network links at a plurality of rates complying with a plurality of protocols.

The method further includes reading the frame complying with the first protocol and the frame complying with the second protocol at a system clock rate, and inserting an internal header in a same format for the frame complying with the first protocol and the frame complying with the second protocol, the internal header indicating a frame protocol type and identifying the first sub-port and the second sub-port such that the same logic can be used to process the frame complying with the first protocol and the frame complying with the second protocol.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features. These embodiments depict the novel and non-obvious systems and methods for rate matching in networks shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

Figure 1:
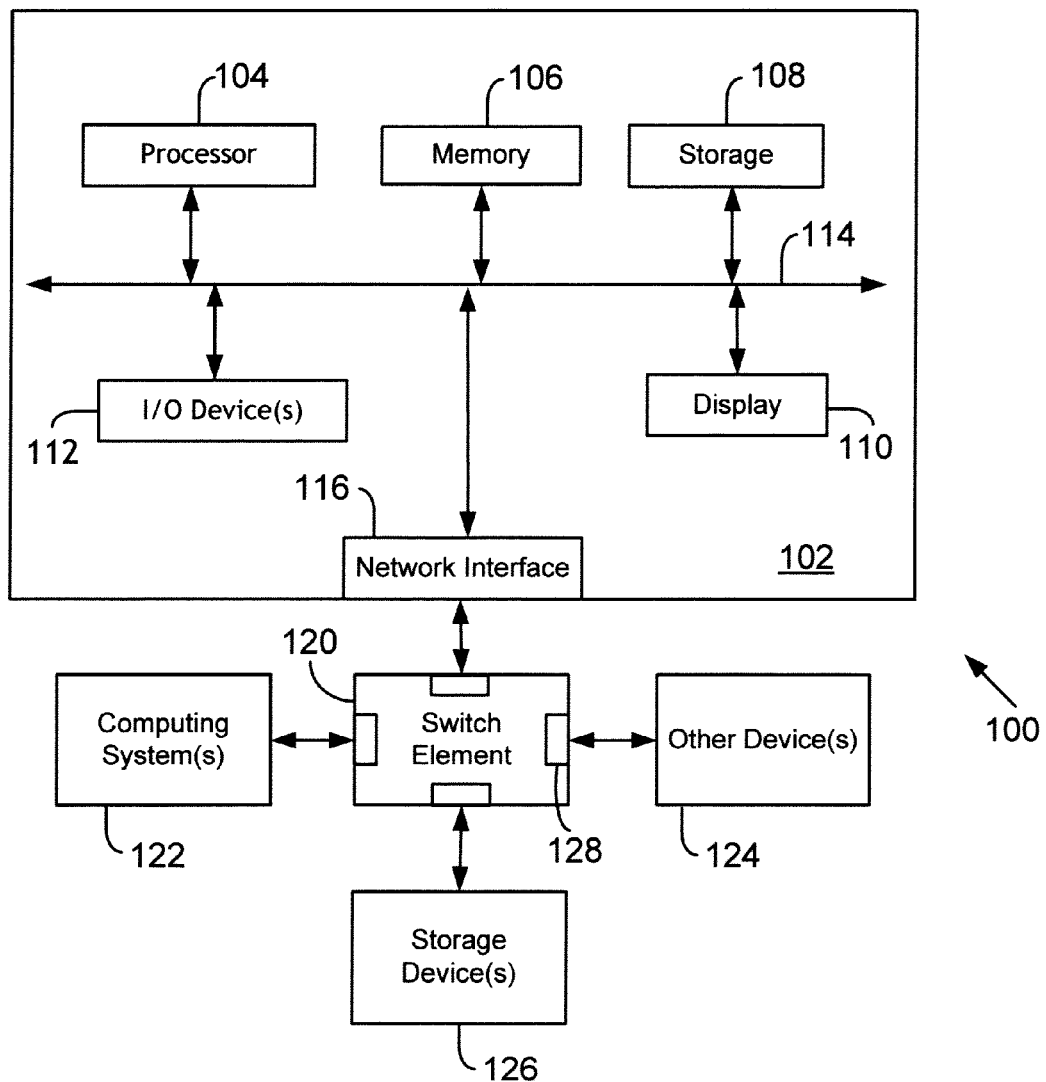

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory, computer-readable media. The computer program product may be computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame includes source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, including an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g., the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g., network interface 116 for the host system 102 and interface (not shown) for the storage devices 126. Fabric ports are typically located in Fabric devices, such as the switch element 120. Details regarding the switch 120 are provided below.

Figure 2A:
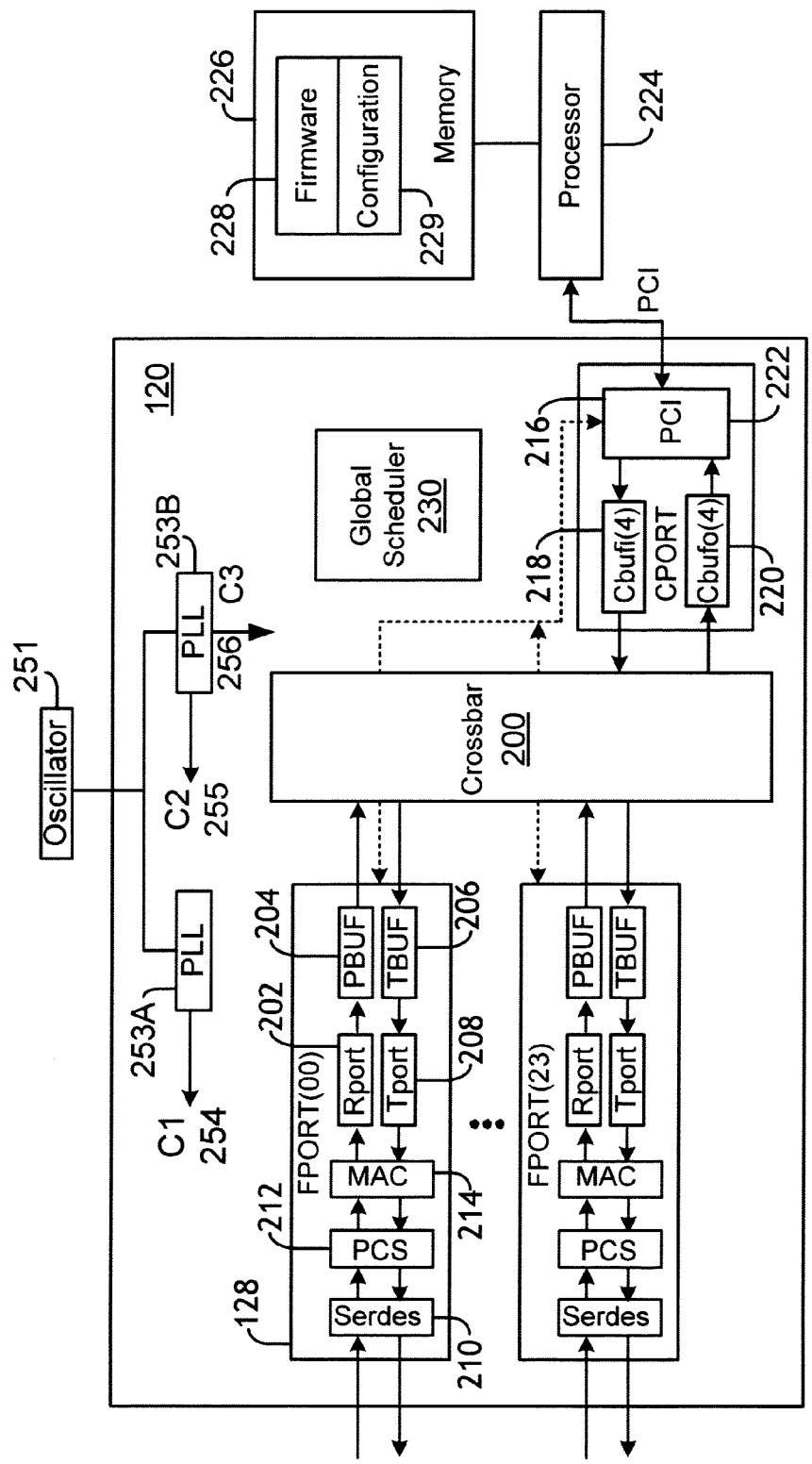
FIG. 2A is a functional block diagram of a switch element (or network device) according to one embodiment.

FIG. 2A is a high-level block diagram of switch element 120, also referred to as the switch 120 having a plurality of ports 128. Switch element 120 may be implemented as an application specific integrated circuit (ASIC). An external oscillator 251 may be used to power a plurality of phase locked loop (PLL) circuits 253A-253B to generate a plurality of clocks, C1 254, C2 255, and C3 256 that are described below in detail. As an example, C1 254 may be 425 MHz when a port is configured to operate as a Fibre Channel port, C2 255 may be 312 Mhz when a port is configured to operate as an Ethernet port, and C3 256 may be a system clock of 825 MHz. The embodiments disclosed herein are not limited to any particular clock rate.

Switch element 120 may have a plurality of ports 128. Ports 128 are generic (GL) ports and may include an N_Port, F_Port, FL_Port, E_Port, or any other port type. The ports 128 may be configured to operate as FCoE or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information/packets) and processes the frames according to various protocol requirements. The port 128 includes a shared, time multiplexed receive path for receiving frames (or information). The receive path includes a serializer/deserializer (SERDES) 210, a physical coding sub-layer (PCS) 212, and a time shared media access control (MAC) sub-layer 214. The SERDES 210 receives incoming serial data at clock C1 254 or C2 255 and converts it to parallel data. The parallel data is then sent to the PCS 212 for processing. The data is processed by PCS 212 and then read at clock C3 256, e.g., the system clock generated by PLL 253B. The data from PCS 212 is sent to MAC 214 before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) 208 via the crossbar 200. The TPORT 208 includes a memory device shown as a transmit buffer (TBUF) 206. The TBUF 206 may be used to stage frames or information related to frames before being transmitted. The TPORT also includes a shared MAC and PCS or may simply share PCS 212 and MAC 214 described above. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226 via a PCI bus or any other interconnect type. The processor 224 controls overall switch element operations, and the memory 226 may be used to store firmware instructions 228 for controlling switch element 120 operations. Memory 228 may also be used to configuration information 229 for each port 128, as well as sub-ports within port 128, described below in detail.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of independently operating sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, one double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
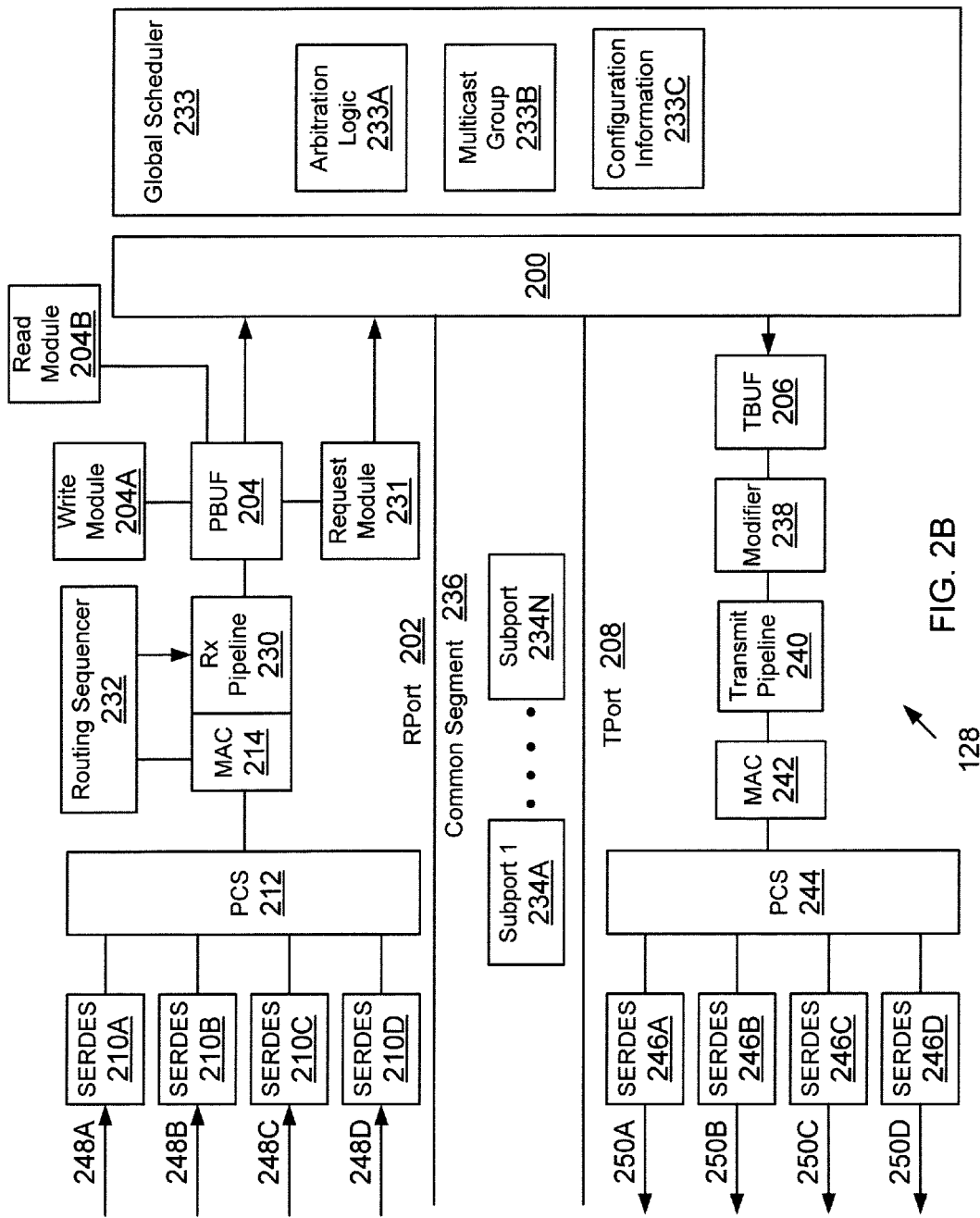
FIG. 2B is a functional block diagram of a base-port of a switch element, according to one embodiment.

FIG. 2B shows an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128.

In one embodiment, base-port may be configured to include a plurality of sub-ports. The configuration information/logic 234A-234N for each sub-port may be stored in common segment 236. In one embodiment, configuration information 234A-234N includes information regarding a protocol that a sub-port may be configured to operate at, as well as the speed at which the sub-port operates. This allows the logic/modules within the RPORT to operate and support the configured protocol/operating speed.

Port 128 may include or have access to a plurality of network links (or lanes), for example, four independent physical network links 248A-248D, each configured to operate as a portion of an independent sub-port within base-port 128. Each network link is coupled to a SERDES 210A-210D that share PCS 212 and MAC 214. The multiple lanes also share a receive pipeline 230 that is used for pre-processing received frames before they are transferred. Both MAC 214 and receive pipelines 230 are time multiplexed so that they can be shared among the plurality of links based on how the ports are configured to operate. In one embodiment, MAC 214 and PCS 212 may be a part of the receive pipeline 230.

Incoming frames for each sub-port are received via one of the network links 248A-248N. The received frame is processed by the appropriate SERDES for the sub-port and then sent to the PCS 212. After PCS 212 processes the frame, the frame is provided to MAC 212 that is time shared among the plurality of sub-ports. This means that for a certain time segment (for example, one or more clock cycles). MAC 214 may be used by one of the sub-ports. After the MAC 214 processes the frame it is sent to receive pipeline 230 that is also time shared. Information regarding the frame or a copy of the frame is also provided to a routing sequencer 232 that determines the destination of the received packets. In one embodiment, a frame whose destination is processor 224 is given the highest priority, followed by a frame that is routed by a TCAM (ternary content addressable memory) or steering registers located within the routing sequencer 232, as described below in detail. More than one routing sequencer may be used for each base-port 128. Frames that are ready to be sent out are then staged at PBUF 204. PBUF 204 may have a plurality of queues that may be referred to as receive queues. The receive queues temporarily store frames, until a request to move the frame is granted.

Frames are written to PBUF 204 by a write module 204A that has access to sub-port configuration information stored at the common segment 236. Frames are read from PBUF 204 by a read module 204B that also has access to sub-port configuration information. The write module 204A and the read module 204B use the configuration information for managing write and read operations from PBUF 204. One reason, why the configuration information may be used to write and read from PBUF 204 is because different protocols/operating rates may have different requirements.

To move frames from the receive queues of PBUF 204; a request module 231 generates requests for a global scheduler 233, also referred to as scheduler 233. Request module 231 maintains a data structure (not shown) that tracks a number of requests that may be pending for each sub-port. Request module 231 also removes requests from the data structure when a grant is received for a particular request.

Scheduler 233 stores configuration information 233C for various ports and some of that information may be used to select requests. Scheduler 233 includes arbitration logic 233A that performs dual stage arbitration for requests from various base-ports. Scheduler 233 also maintains a data structure at a memory labeled as multicast group 233B. The data structure stores information for identifying multicast groups that may receive multicast frames, e.g., frames that are destined to multiple destinations.

Frames for transmission via TPORT 208 move via TBUF 206 and a frame modifier 238. In one embodiment, frame modifier 238 may be used to insert, change or remove information from an outgoing frame. The modification is based on the frame type and transmit virtual queue. The time shared transmit pipeline 240 and MAC 242 are used to process outgoing frames. PCS 244, SERDES 246A-246D are used similar to PCS 212 and SERDES 210A-210D. Network links 250A-250D are similar to links 248A-248D, except links 250A-250D are used to transmit frames. For clarity, separate PCS and MAC are shown in FIG. 2B for the receive and transmit paths. However, only a single PCS 212 and MAC 214 may be used for both receive and transmit paths. Furthermore, links 248A-248D and 250A-250D may be the same physical link for sending and receiving frames at base-port 128.

Figure 2C:
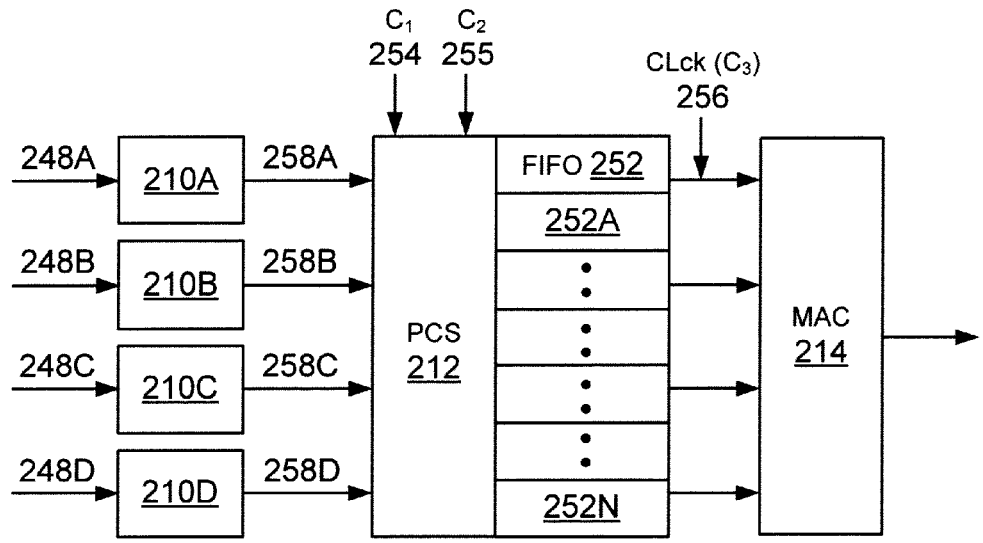
FIGS. 2C and 2D are functional block diagrams showing use of different clocks in a switch element, according to the present embodiments.

FIG. 2C illustrates an example of receiving frames 258A-258D at PCS 212 from SERDES 210A-210D. The frames may be received at different clock rates based on the configuration of network links 248A-248D and the associated sub-ports. As an example, data may be received at PCS 212 and stored at C1 254 and/or C2 255 and then read out of PCS 212 at clock C3 256 that may also be referred to as system clock. PCS 212 includes a memory storage device (shown as FIFO) 252 having a plurality of storage locations 252A-252N. The storage locations are used to stage frames or portions of a frame before the frames are read out at C3 256. The storage locations 252A-252N may be used to prevent overrun or under run conditions.

Figure 2D:
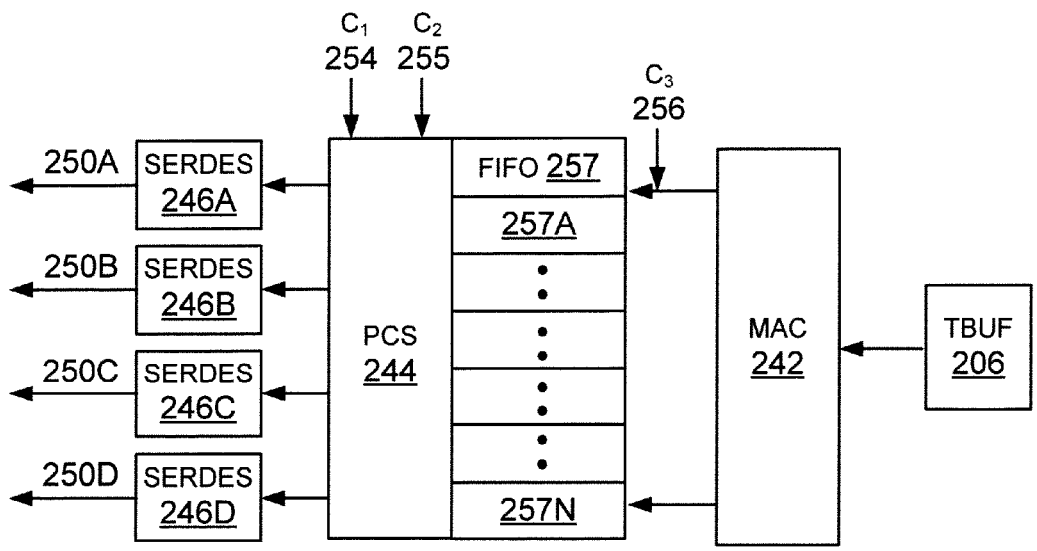

In the transmit path, as shown in FIG. 2D, frames are received at FIFO 257 of PCS 244 via TBUF 206 and shared MAC 242. In the transmit path, frames are written to FIFO 257 using the system clock 256 and read out at a clock rate C1 254 of the sub-port. A read control logic (not shown) is used to read data from TBUF 206 to avoid any errors due to a mismatch between the system clock and the clock at which data is read out for transmission from PCS 244.

Figure 2E:
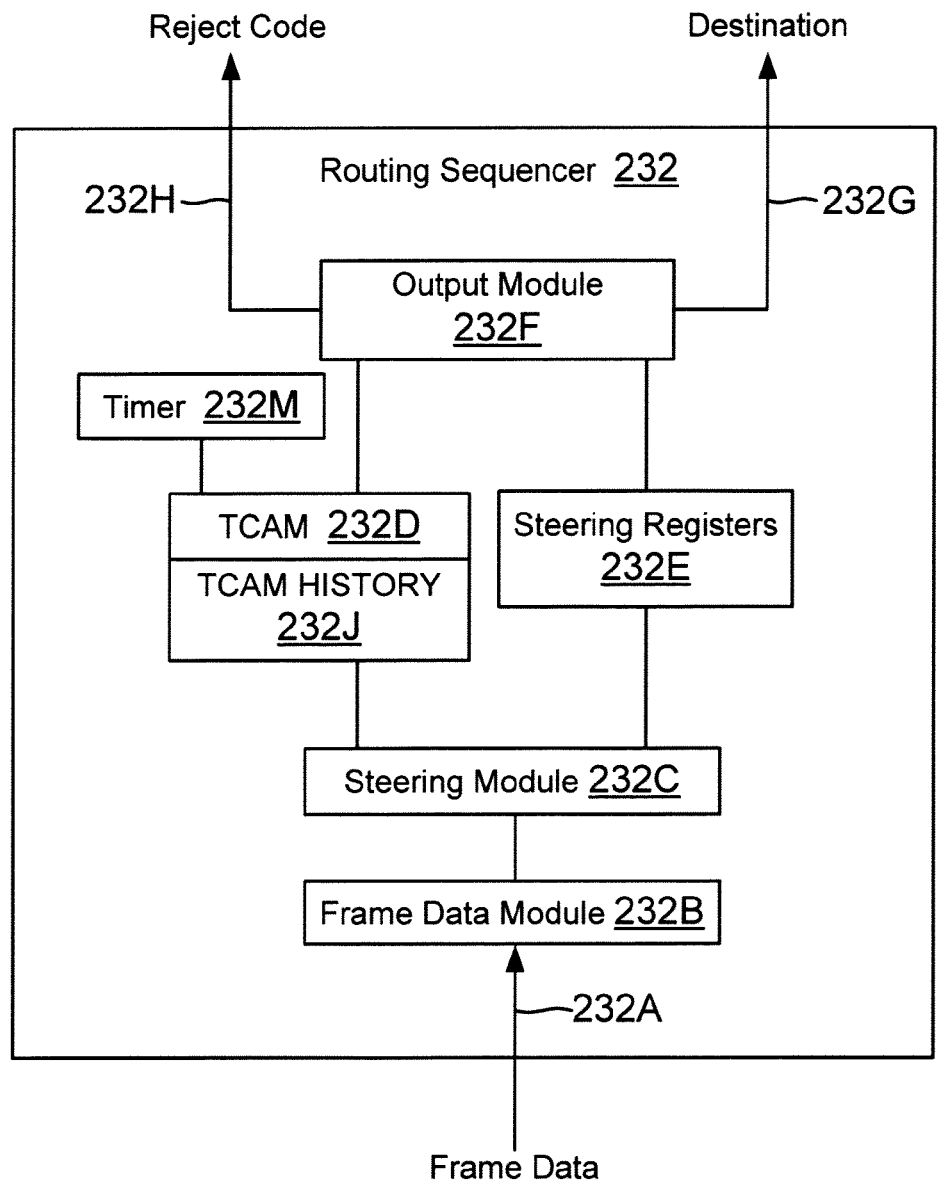
FIG. 2E is a functional block diagram of a routing sequencer, according to one embodiment.

FIG. 2E is a functional block diagram of routing sequencer 232, used according to one embodiment. The routing sequencer 232 receives frame data 232A that is staged at frame data module 232B. The frame data 232A is then used by a steering module 232C to select a destination. The destination may be selected based on certain frame fields, for example, an identifier of a frame source and/or a destination identifier. The steering module 232C may select the destination using a TCAM 232D or a steering register 232E, or a combination of the two. The steering registers 232E are used if there is no TCAM match and the frame is a Fibre Channel or FCoE type frame. If a match is found, then a destination 232G is provided by an output module 232F to request module 231. If there is no match and the frame type is not Fibre Channel or FCoE, then the output module 232F generates a reject code 232H.

Unlike standard computer memory, such as random access memory (RAM), in which a user supplies a memory address and the RAM returns the data word stored at that address, TCAM 232D is designed such that when a data word is supplied by steering module 232C. TCAM 232D searches its entire memory to see if that data word is stored anywhere in it. If the data word is found, TCAM 232D returns a list of one or more storage addresses where the word was found.

TCAM 232D also maintains a TCAM history module 232J to determine what TCAM entries have been matched so that old entries can be removed. TCAM history module 232J may be used to track information that may be included in received packets, for example, source MAC address, virtual local area network (VLAN) identifier information, or other packet fields as described below in detail. Routing sequencer 232 may also include a timer module 232M that may be used to purge TCAM history. In one embodiment, firmware is used to periodically purge the TCAM history bits in the TCAM history module 232J.

Figures 3A, 3B, 3C:
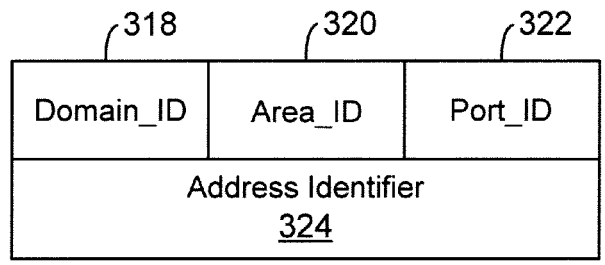
FIGS. 3A-3C illustrate different frame formats used by a switch element, according to the present embodiments.

FIG. 3A shows an example of an FCoE packet format 300 for processing network and storage traffic, according to the present embodiments. The FCoE packet 300 includes an Ethernet header 302. In one embodiment, the Ethernet header 302 may be 14 bytes in length includes the Ethernet type and optional tags, for example. The FCoE packet 300 also includes an FCoE header 304 that includes the reserved fields. A start of frame (SOF) 306 indicates the beginning of a Fibre Channel frame and may be 1 byte, for example.

The FCoE packet 300 may also include a Fibre Channel header (FC Header) 308 that may be 24 bytes long with a payload 310. The Fibre Channel cyclic redundancy code (CRC) 312 may be 4 bytes and the end of frame (EOF) 314 may be 1 byte in size. The EOF 514 indicates the end of the embedded Fibre Channel frame. The Ethernet FCS 316 is inserted after the Fibre Channel EOF 314.

FIG. 3B shows a standard 24-bit Fibre Channel address identifier 324. The address identifier 324 includes a Domain_ID 318, an Area_ID 320, and a Port_ID 322. The Domain_ID 318 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 320 is an Area identifier based on the middle 8 bits of the 24-bit Fibre Channel address. The Area_ID 320 applies either to (a) one or more N_Ports within and attached to a Fibre Channel switch, or (b) to an Arbitrated Loop of NL_Ports attached to a single FL_Port.

The Port_ID 322 is the lower 8-bits of a Fibre Channel address. The Port_ID 322 applies to either (a) a single N_Port or virtualized N_Port within a Domain/Area, (b) the valid AL_PA of a single NL_Port or FL_Port on an Arbitrated Loop.

FIG. 3C shows an example of the FC header 308 of FIG. 3A. The following frame header fields that are used in the present methods are:

D_ID 308A—A 24-bit Fibre Channel frame header field that contains the destination address for a frame; and S_ID 308B—A 24-bit Fibre Channel frame header field that contains the source address for a frame.

Figure 3D:
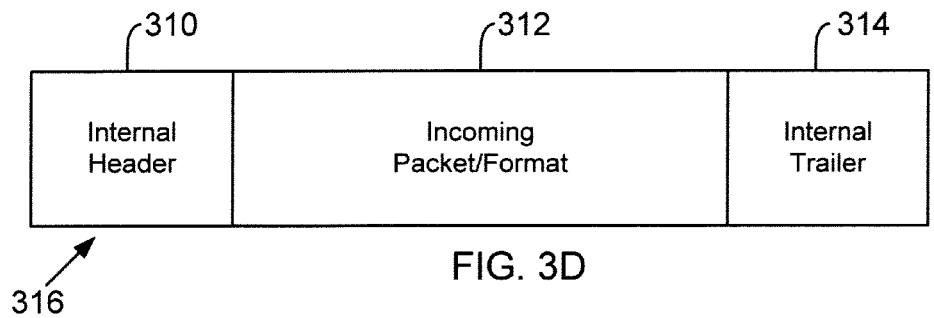
FIG. 3D illustrates an internal format used by a switch element, according to one embodiment.

FIG. 3D shows an example of an internal switch format 316 used by switch element 120 to process frames/packets complying with different protocols. The term "internal" as used herein means used by the switch element only. The internal format is the same regardless of the incoming frame format. This allows the various hardware/firmware components to process the incoming frames without having to use dedicated protocol-specific logic/hardware components. In one embodiment, format 316 allows a frame to exist outside the switch element 120 and within the switch element 120 without using special 10B characters to delineate between when a frame starts and ends.

Internal format 316 includes an internal header 10 and an internal trailer 314. The internal header 310 and trailer 314 are added to an incoming Ethernet/Fibre Channel/FCoE packet 312 received by a sub-port. The internal header 310 is added by MAC 214 and includes a protocol bit that indicates if the frame is a Fibre Channel frame or any other protocol type. As an example, MAC 214 may set a bit value in internal header 310 to zero, which may indicate that incoming frame 312 is a Fibre Channel frame. A value of 1 may be used to indicate an Ethernet frame.

Internal header 310 also includes an identifier that identifies a sub-port at which the incoming frame is received. When the received frame is a Fibre Channel frame, then internal header 310 also includes a compacted SOF value. The compacted SOF is generated from the received standard FC SOF delimiter value. Internal header 310 may also include other fields, for example, a reject code and others.

Internal trailer 314 may also be generated by MAC 214, according to one embodiment. The internal trailer 314 includes a timestamp that stays consistent with the incoming frame 314 while it stays within switch element 120. Internal trailer 314 may also include a compacted end of frame code that is derived from the end of frame 314 of the received frame.

Figure 4A:
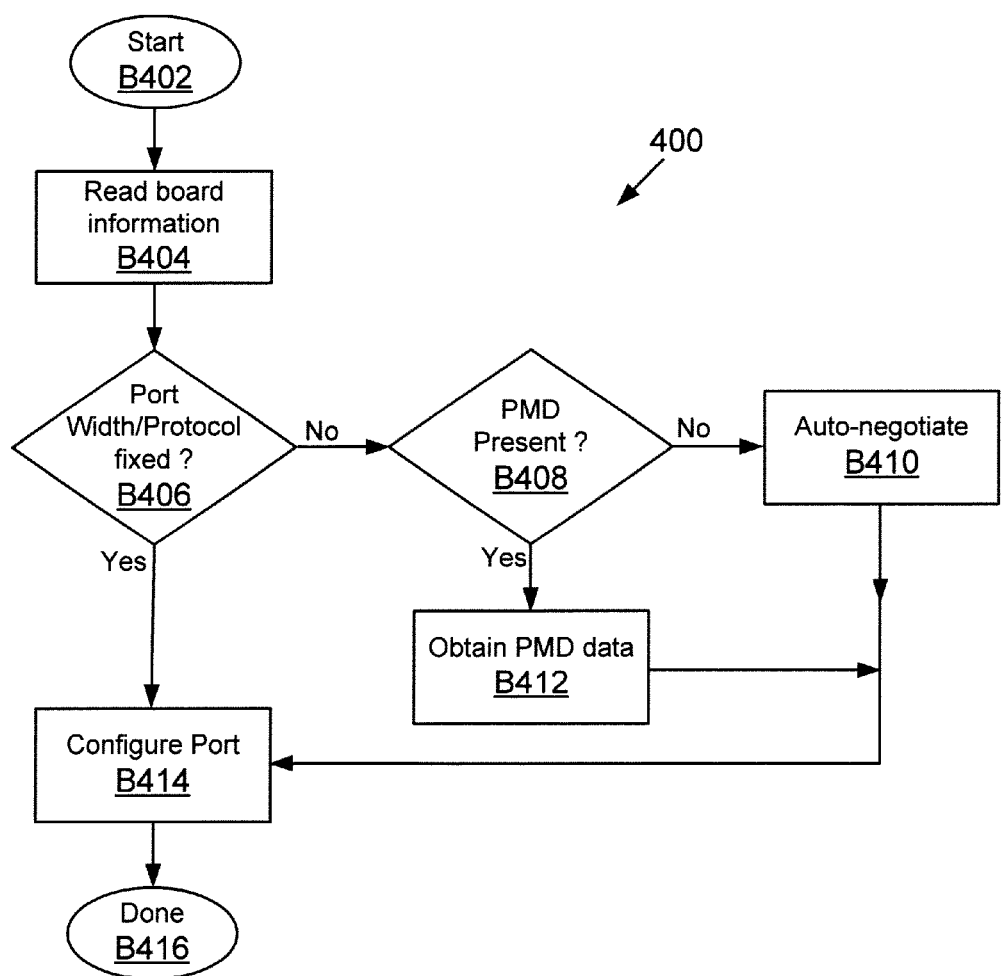
FIGS. 4A, 4B, 5 and 6 are process flow diagrams according to the present embodiments.

FIG. 4A illustrates a process 400 for configuring one or more ports of switch element 120, according to one embodiment. The process starts at block B402. At block B404, configuration information 229 (FIG. 2A) regarding a board is read by processor 224. The board in this context means the printed circuit board that houses the logic for the switch element 120. As an example, the configuration information 229 may be stored at memory 226. The configuration information 229 includes how each port of switch element 120 is to be configured.

At block B406, processor 224 determines if a port's operating speed and protocol are fixed. If yes, then the port is configured accordingly at block B414, and the process ends at block B416.

If the port configuration is not fixed, as determined at block B406, the process moves to block B408. At block B408, processor 224 determines if a physical media device (PMD) is present. A PMD is typically coupled to a port and the link to the port. PMDs typically have hardware components and non-volatile memory for storing PMD configuration information. Details regarding PMDs are not germane to the embodiments described herein.

If a PMD is present, then the PMD configuration data is obtained by processor 224 at block B412 and the process moves to block B414. If a PMD is not present, then at block B410, the ports perform an auto-negotiation process based on the protocol by which they are configured. The process then moves to block B414 where the ports are configured, and the process ends at block B416.

Figure 4B:
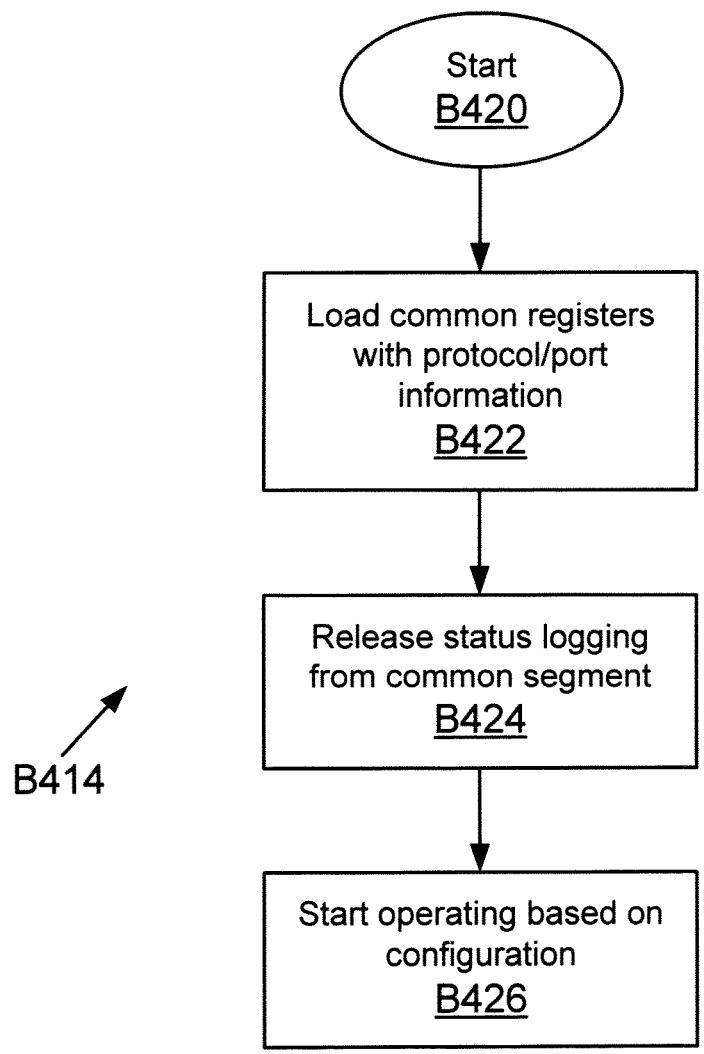

FIG. 4B illustrates a block diagram for block B414 of FIG. 4A. The process starts at block B420. At block B422, registers at common segment 236 are loaded with protocol and port information. At block B424, status logging and statistics gathering is initialized at common segment 236. The reporting of status and the gathering of statistics may be blocked while a sub-port completes the configuration process to prevent erroneous status and statistics from being collected and saved. During the configuration process the inputs into the sub-port may not be valid or may not be interpreted by the sub-port correctly, leading to erroneous results. Thereafter, the port starts operating at block B426.

Figure 5:
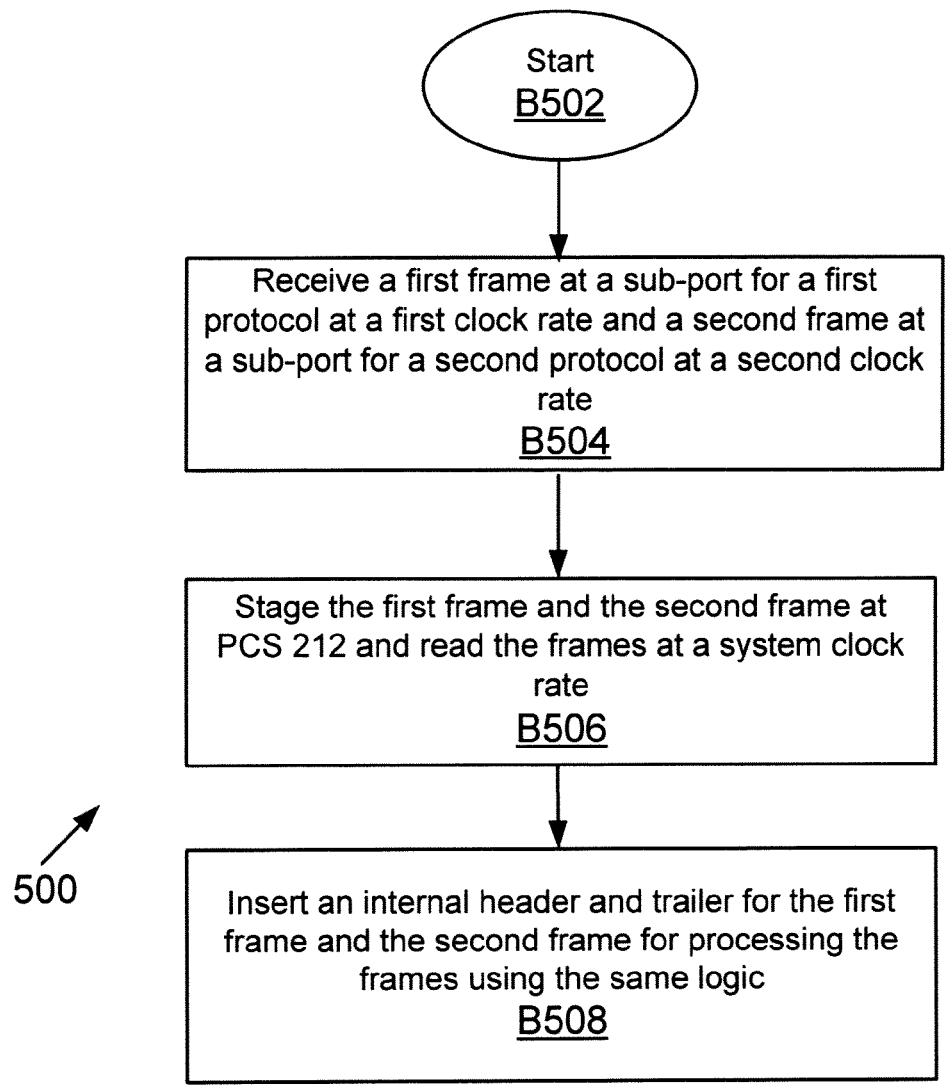

FIG. 5 illustrates a process 500 for processing frames complying with multiple protocols, while using the same logic described above. The process begins at block B502, after a switch element has been configured, as described above. At block B504, a first frame is received for a first sub-port at a first clock rate (for example, C1 254). The first frame may comply with a first protocol (for example, Fibre Channel). A second frame is received for a second sub-port at a second clock rate (for example, C2 255). The second frame may be an Ethernet or FCoE frame. At block B506, the frames are staged at PCS 212 and then read by MAC 214 at the system clock rate C3 256.

Thereafter, at block B506, MAC 214 inserts an internal header 310 and trailer 314 for the first frame and the second frame. The format for the internal header and the trailer is the same for both the frame types. This allows switch element 120 to process frames using the same, time-shared logic, without having to use dedicated, protocol-specific logic. For example, the same PCS 212, MAC 214, routing sequencer 232. PBUF 204, write module 204A, read module 204B, and request module 231 are used to process the frames complying with multiple protocols.

Figure 6:
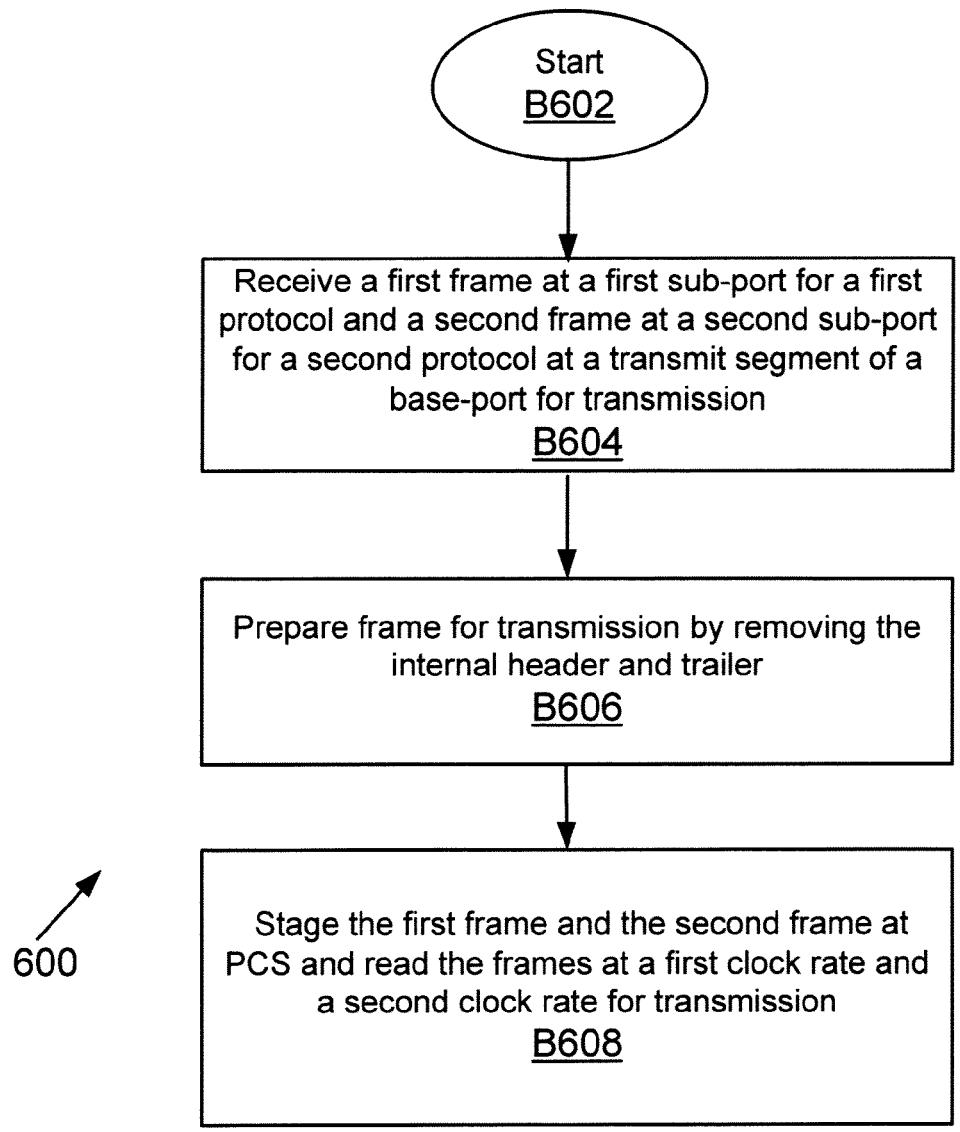

FIG. 6 illustrates a process 600 for transmitting frames complying with multiple protocols, while using the same logic described above. The process begins at block B602, after a switch element has been configured, as described above. At block B604, a first frame is received for a first sub-port at TPORT 208 at the system clock rate C3 256. The first frame may comply with a first protocol, for example, Fibre Channel. A second frame is received for a second sub-port at TPORT 208. The second frame may be an Ethernet or FCoE frame. At block B606, the frames are prepared for transmission by frame modifier 238 and MAC 242. The internal headers and trailers are removed, and then at block B608 the frames are staged at PCS 244, for example, at FIFO 257 (FIG. 2D). The first frame is read at a first clock rate, for example C1 254, and the second frame is read at a second clock rate, for example C2 255. The frames are then transmitted using network links 250A-250D.

Using the internal header and trailer allows switch element 120 to use the same logic for transmitting frames. For example, TBUF 206, modifier 238, MAC 242 (or 214), and PCS 244 (or 212) are used for processing frames before they are transmitted.

In one embodiment, a switch element 120 is provided that can efficiently process information received at different operating rates and complying with different protocols. A consistent format is used by the various logic modules, regardless of the protocol type.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the embodiments described above can be used in any network device including adapters, network interface cards and others. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A network device, comprising:
a plurality of base-ports, each base-port coupled to a plurality of network links and each base-port including a plurality of sub-ports configured to operate as independent ports for sending and receiving information using one of the plurality of network links at a plurality of rates complying with a plurality of protocols, each sub-port including its own serializer/deserializer (SERDES) connected to one of the plurality of network links; and
a receive segment for receiving frames for the plurality of sub-ports complying with the plurality of protocols, wherein a frame complying with a first protocol is received at a first clock rate for a first sub-port and a frame complying with a second protocol is received at a second clock rate for a second sub-port, and after pre-processing both the frames are processed by a same logic of the receive segment at a system clock rate;
wherein to process frames regardless of protocol type, the receive segment adds an internal header for the frame complying with the first protocol and a second internal header for the frame complying with the second protocol, each internal header indicating a frame protocol type of the associated frame and identifying a sub-port origin of the frame, such that the same logic can be used to process the frame complying with the first protocol and the frame complying with the second protocol;
wherein the frame complying with the first protocol is received at a physical coding layer (PCS) at the first clock rate and the frame complying with the second protocol is received at the second clock rate at the PCS shared by the first sub-port and the second sub-port;
wherein a media access control layer (MAC) shared by the first sub-port and the second sub-port reads the frame complying with the first protocol and the frame complying with the second protocol at the system clock rate; and wherein the MAC also inserts a trailer in a same format for the frame complying with the first protocol and the frame complying with the second protocol.

2. The network device of claim 1, wherein the network device is a switch element coupled to one or more devices.

3. The network device of claim 1, wherein the first protocol is Fibre Channel.

4. The network device of claim 1, wherein the second protocol is Ethernet or Fibre Channel over Ethernet.

5. The network device of claim 1, wherein the MAC inserts the internal header in a same format for the frame complying with the first protocol and the frame complying with the second protocol.

6. A network device, comprising:

a plurality of base-ports, each base-port coupled to a plurality of network links and each base-port includes a plurality of sub-ports configured to operate as independent ports for sending and receiving information using one of the plurality of network links at a plurality of rates complying with a plurality of protocols, each sub-port including its own serializer/deserializer (SERDES) connected to one of the plurality of network links; and a receive segment for receiving frames for the plurality of sub-ports complying with the plurality of protocols, wherein a frame complying with a first protocol is received at a physical coding layer (PCS) at a first clock rate for a first sub-port and a frame complying with a second protocol is received by the PCS at a second clock rate for a second sub-port, and after pre-processing both the frames are read by a media access control layer (MAC) for processing at a system clock rate;

wherein to process frames regardless of protocol type, the MAC adds an internal header for the frame complying with the first protocol and a second internal header for the frame complying with the second protocol, each internal header indicating a frame protocol type of the associated frame and identifying a sub-port origin of the frame, such that a same logic can be used to process the frame complying with the first protocol and the frame complying with the second protocol; and wherein the MAC inserts a trailer in a same format for the frame complying with the first protocol and the frame complying with the second protocol.

7. The network device of claim 6, wherein the MAC and PCS are time-multiplexed and shared between the first sub-port and the second sub-port.

8. The network device of claim 6, wherein the first protocol is Fibre Channel.

9. The network device of claim 6, wherein the second protocol is Ethernet or Fibre Channel over Ethernet.

10. A machine implemented method, comprising:

receiving a frame complying with a first protocol at a first clock rate for a first sub-port and a frame complying with a second protocol at a second clock rate for a second sub-port at a base port from among a plurality of base-ports of a network device, where the base-port is coupled to a plurality of network links and includes a plurality of sub-ports configured to operate as independent ports for sending and receiving information using one of the plurality of network links at a plurality of rates complying with a plurality of protocols, each sub-port including its own serializer/deserializer (SERDES) connected to one of the plurality of network links;

reading the frame complying with the first protocol and the frame complying with the second protocol at a system clock rate; and inserting an internal header in a same format for the frame complying with the first protocol and a second internal header for the frame complying with the second protocol, each internal header indicating a frame protocol type of the associated frame and identifying a sub-port origin of the frame, such that a same logic can be used to process the frame complying with the first protocol and the frame complying with the second protocol;

wherein the frame complying with the first protocol and the frame complying with the second protocol are received at a physical coding layer (PCS) shared by the first sub-port and the second sub-port;

wherein a media access control layer (MAC) shared by the first sub-port and the second sub-port reads the frame complying with the first protocol and the frame complying with the second protocol at the system clock rate; and wherein the MAC inserts a trailer in a same format for the frame complying with the first protocol and the frame complying with the second protocol.

11. The method of claim 10, wherein the first protocol is Fibre Channel.

12. The method of claim 10, wherein the second protocol is Ethernet or Fibre Channel over Ethernet.

13. The method of claim 10, wherein the MAC inserts the internal header in a same format for the frame complying with the first protocol and the frame complying with the second protocol.

* * * * *